Nov. 11, 1969  H. ETZ  3,477,102
METHOD OF MANUFACTURING TAMPONS
Filed Oct. 21, 1965  6 Sheets-Sheet 1
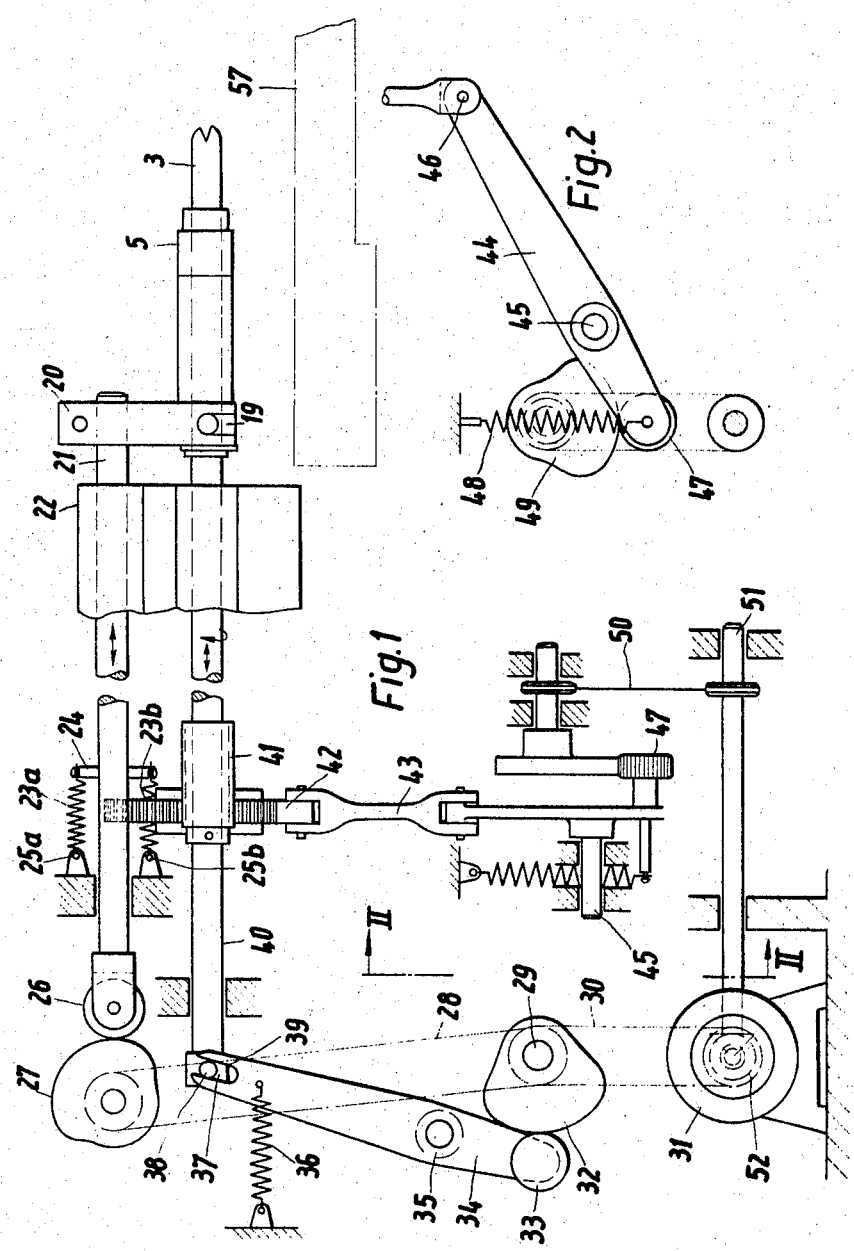
Inventor:
HERBERT ETZ
BY Bergen, Dinklage & Sprung
ATTORNEYS Nov. 11, 1969 H. ETZ 3,477,102

METHOD OF MANUFACTURING TAMPONS

Filed Oct. 21, 1965 6 Sheets-Sheet 2

*Inventor:*
HERBERT ETZ
BY *Burgess, Dinklage*
*& Sprung*
ATTORNEYS

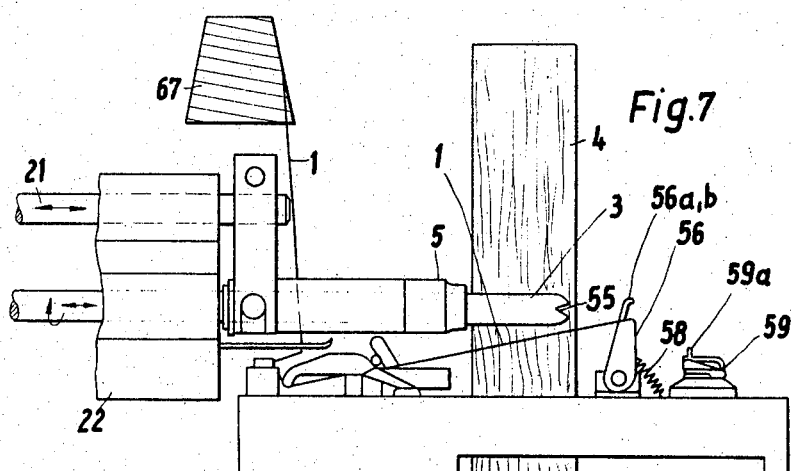
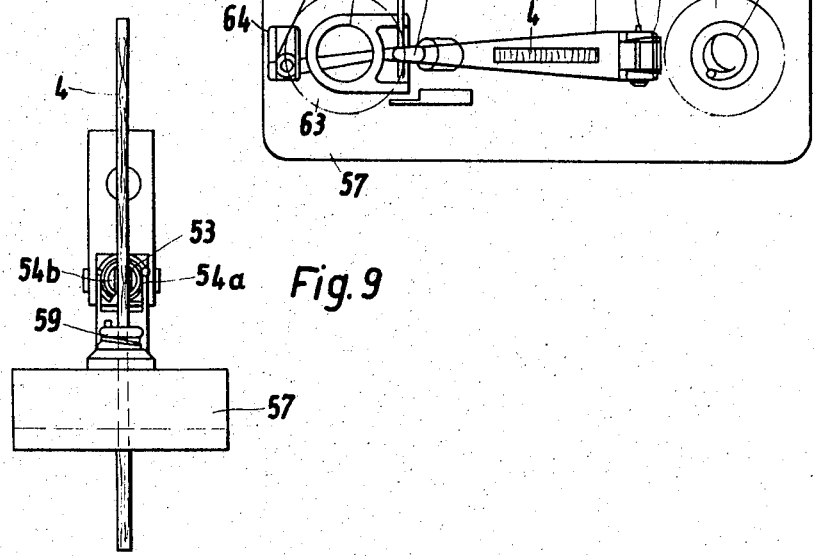

Nov. 11, 1969 H. ETZ 3,477,102
METHOD OF MANUFACTURING TAMPONS
Filed Oct. 21, 1965 6 Sheets-Sheet 4
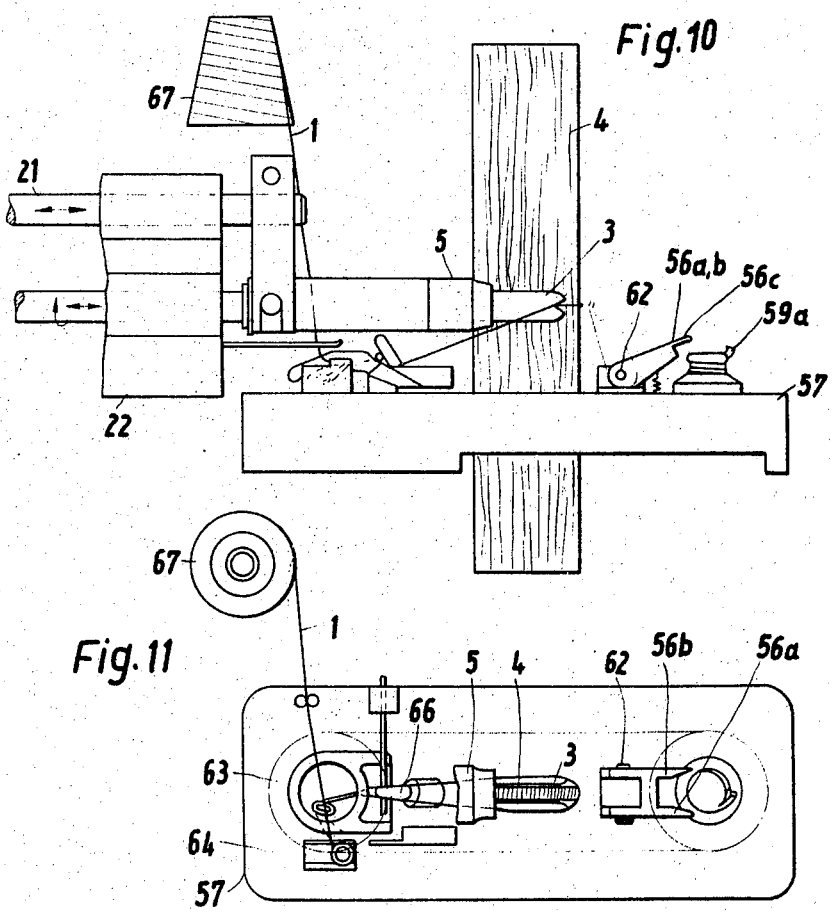
Inventor:
HERBERT ETZ
BY Burgers, Dinklage & Sprung
ATTORNEYS Nov. 11, 1969     H. ETZ     3,477,102
METHOD OF MANUFACTURING TAMPONS
Filed Oct. 21, 1965     6 Sheets-Sheet 5
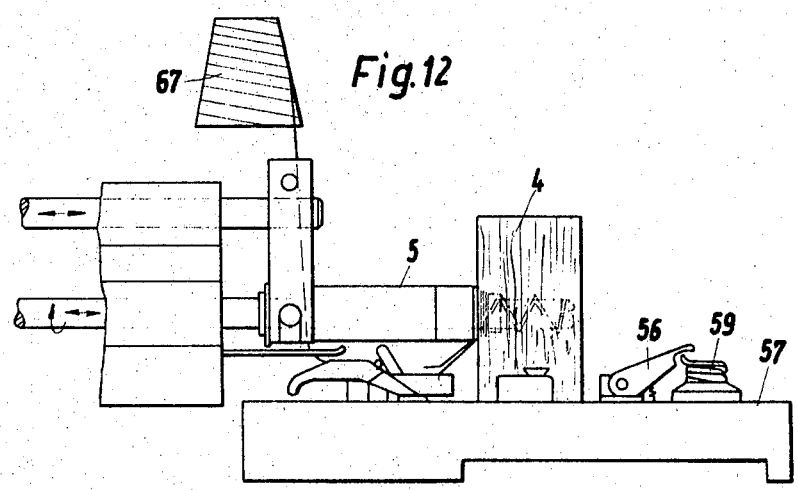
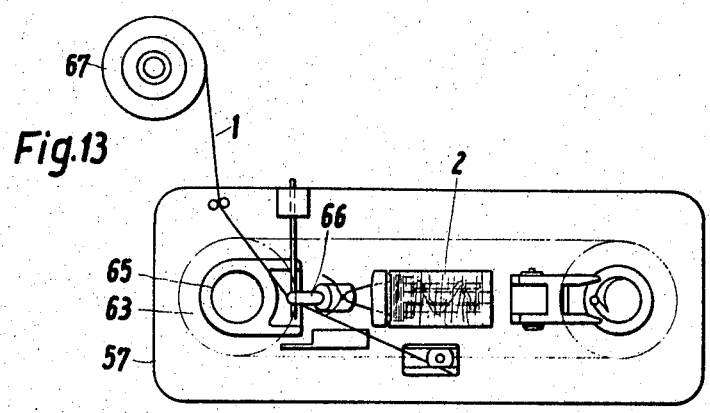
Inventor:
HERBERT ETZ
BY Burgess, Dinklage &
Sprung
ATTORNEYS

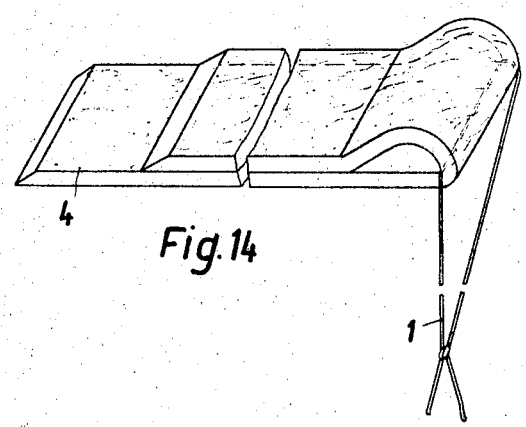
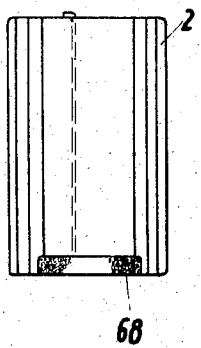
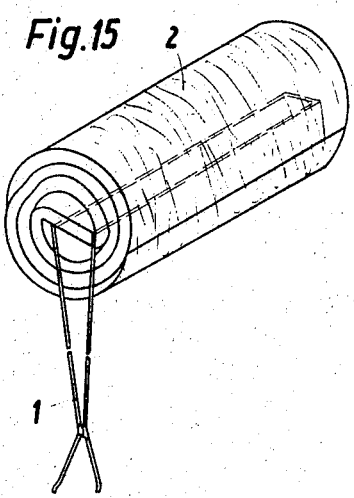
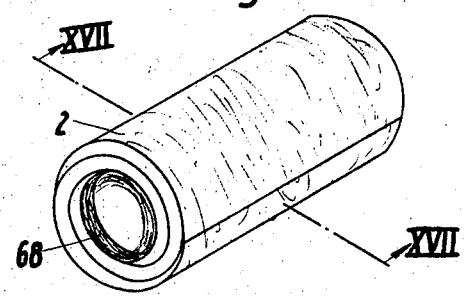

United States Patent Office 3,477,102
Patented Nov. 11, 1969

3,477,102
METHOD OF MANUFACTURING TAMPONS
Herbert Etz, Parksiedlung 6, Wuppertal-
Langerfeld, Germany
Filed Oct. 21, 1965, Ser. No. 502,780
Claims priority, application Netherlands, Oct. 22, 1964,
6412326
Int. Cl. A61f 15/00
U.S. Cl. 19—144.5                         2 Claims

ABSTRACT OF THE DISCLOSURE

Tampon and apparatus and method of making such tampon, which tampon comprises a rolled piece of cotton wadding having a knotted loop of thread about a generally central portion of the wadding wherein the thread is looped about the wadding before rolling and the wadding is then folded about the thread and thereupon rolled starting from the thread-bearing portion of the wadding such as will provide such thread in the generally centrally disposed portion of the rolled wadding. The apparatus by which this wadding is made includes a rotary mandrel, a superimposed coaxial sleeve on said mandrel, means for reciprocating the sleeve, the mandrel and thread-guiding means on both the sleeve and the mandrel. According to the method described, cotton wadding is provided on a rotating mandrel, a loop of thread is slung, widthwise, about a portion of the wadding. The wadding is folded about the loop of thread to provide an annular recess suitable for superimposition upon the rotating mandrel and rolling up the thus folded wadding into a tampon having a drawstring attached thereto.

---

The invention relates to catamenial tampons of the type comprising a rolled pad of wadding, such as cotton wool, provided with a draw thread for removal purposes.

Draw threads are apt to complicate the process of rolling the pad of wadding and to be a hindrance in the subsequent packing and marketing of the articles.

An object of the invention is to provide an improved method of and apparatus for assembling tampons of the type above referred to and, in particular, for manipulating and interengaging the draw thread and the wadding pad in the operation of rolling up the latter resulting in a final formation of the free end of the draw thread such that it lies within the overall external dimensions of the rolled pad, presents a neat appearance and can be located without difficulty by the user.

The method according to the invention for the production of a tampon by rolling up a wadding pad upon a rotating mandrel comprises the steps of forming a knotted loop of draw thread loosely around said wadding pad, said loop surrounding the wadding pad in a plane substantially parallel to the axis of rotation of the mandrel, forming an annular recess within that end of the rolled pad adjacent the knotted ends of the draw thread whilst rolling up the pad by rotation of the mandrel and simultaneously spirally winding the knotted ends of the draw thread into a flat winding seated in said annular recess.

Preferably a hollow sleeve is axially displaced around and along part of the mandrel whilst rotating the latter to roll up the wadding pad, thereby forming an annular recess within that end of the rolled pad adjacent the knotted ends of the draw thread and simultaneously spirally winding the knotted ends of the draw thread into a flat winding seated in said annular recess.

The apparatus according to the invention for the production of a tampon by rolling up a wadding pad upon a rotatory mandrel comprising the mandrel; means for forming a knotted loop of draw thread loosely around the wadding pad before the latter is rolled up on the mandrel, a sleeve mounted for coaxial movement over part of the mandrel but non-rotatable with the mandrel, means for axially reciprocating said sleeve, thread guiding means carried by the mandrel and by the coaxial sleeve, said thread guiding means carried by the sleeve being shaped to intercept and direct the knotted ends of the draw thread internally of said sleeve while the mandrel is rotated and while the sleeve is displaced axially by the reciprocating means into one end of the pad being rolled up, whereby the draw thread is wound into a flat spiral winding seated in an annular recess formed by said displacement of said sleeve into the end of the rolled up pad.

Preferably the end of the sleeve facing the pad of wadding has an annular collar bounded radially outward by a shoulder, into which a guide groove for the draw thread is tangentially directed, said groove being directed opposite to the direction of rotation of the mandrel and merging into a slot extending away from the free end of the mandrel whilst maintaining a constant distance from the longitudinal axis of the mandrel.

Preferably the sleeve tapers towards its free end surrounding the mandrel.

The width of the said guide groove is smaller than that of the annular shoulder so that part of the annular shoulder radially bounds the guide cam on the inside. This ensures perfect hygienic conditons while guiding the draw thread to be wound up.

Advantageously, the guide groove extends over a circumferential angle of about 90° of the hollow sleeve and extends toward the end remote from the free end of the mandrel and merges into a longitudinal slot in the sleeve extending from the free end of the mandrel. The end of the sleeve facing the winding mandrel may be provided with a slotted slide ring which is releasably secured to the sleeve.

Preferably the sleeve and the mandrel are coaxially reciprocated in timed relation by cams driven from a common driving motor.

The apparatus may include an intermediate gear driving a further cam engaging one arm of a double armed lever, the other arm of which is linked to a rack which meshes with a splined bush on the driving shaft of the winding mandrel to impart intermittent rotary motion to said mandrel.

Preferably the winding mandrel has a longitudinal slot embracing each side of the wadding pad, the length of which slot is slightly less than the width of the wadding pad and the opening of the slot slightly larger than the thickness of the wadding pad, and the fork constituted by the slot in the mandrel is provided at the front ends with two notches for the draw thread aligned transversely to the mandrel axis.

These notches may be situated within the range of movement of a thread transfer device, which is arranged to be actuated by the traction exerted on the loop of thread by a knotting device against a restoring spring to pass the knotted loop of the draw thread encircling the wadding pad on to the notches in the winding mandrel.

Preferably the thread transfer device is fork-shaped and is arranged to cooperate with a rotary spiral thread guide driven by a wheel operatively connected with a thread knotting device, said fork having its ends so spaced apart in relation to the diameter of the rotating spiral thread guide that, in each cycle of operation for producing a tampon, a thread loop is transferred to the thread transfer device from the spiral guide, is knotted and is held by the transfer device against spring action in the appropriate position for taking up of the loop by the mandrel.

According to a further feature the ends of the fork-shaped thread transfer device extend over the forwardly projecting part of the spiral thread guide carrying the thread.

The thread transfer device can advantageously be arranged to pivot on an axis parallel with the rotational plane of the wheel which rotates the spiral thread guide.

Preferably the spiral thread guide has a nose extending tangentially beyond the circumference, and which, when the spiral guide is rotated, has an interference range of movement with respect to the movement of the ends of the thread transfer device serving for the uptake of the loop. The nose on the front of the spiral guide thus contributes to the safe transfer of the loop to the thread transfer device.

The method and apparatus will now be described in more detail with reference to an example illustrated in the accompanying diagrammatic drawings, wherein:

FIG. 1 is an apparatus for winding and pressing in the draw thread.

FIG. 2 is a side view of FIG. 1 along the section line II—II.

FIG. 7 is a partial representation of the apparatus according to FIG. 1 before the transfer of the knotted loop on to the winding mandrel.

FIG. 8 is a frontal view of FIG. 7.

FIG. 9 is a side view of FIG. 7.

FIG. 10 shows the apparatus as in FIG. 7 with the loop of the draw thread passed onto the winding mandrel.

FIG. 11 is a frontal view of FIG. 10.

FIG. 12 is a representation according to FIG. 7 and FIG. 10 as the draw thread is being wound into a spool.

FIG. 13 is a frontal view of FIG. 12.

FIG. 14 is a cotton wool pad with a knotted loop of the draw thread passed thereover.

FIG. 15 shows the rolled up cotton wool with the protruding knotted end of the loop of the draw thread.

FIG. 16 shows the draw thread wound into a spool and pressed against the frontal end of the cotton wool roll.

FIG. 17 is a longitudinal section through the tampon as in FIG. 16.

The drawings illustrate an apparatus for curling up the free end of a draw thread 1 and pressing it into one end of a wadding roll 2 of the kind used as menstruation tampons, this pressing operation being performed by means of a slide which, for the purpose of removing the finished roll from a winding mandrel 3, can be moved parallel to said winding mandrel engaging the wadding roll.

Figure 3:
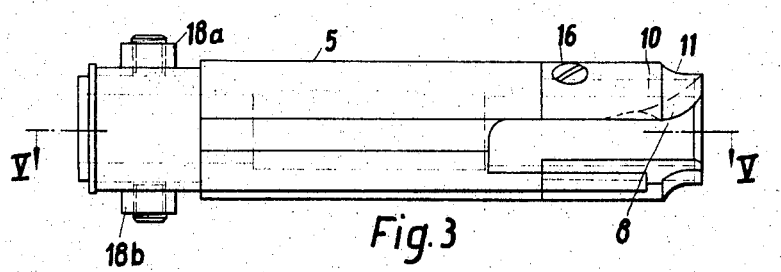
FIG. 3 is a larger scale view of a sleeve shown in FIG. 1.
Figure 4:
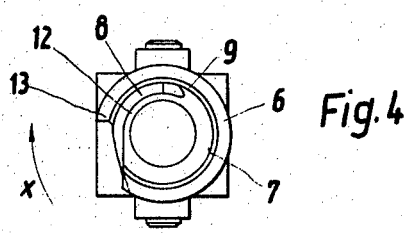
FIG. 4 is a front view of the sleeve as in FIG. 3.
Figure 5:
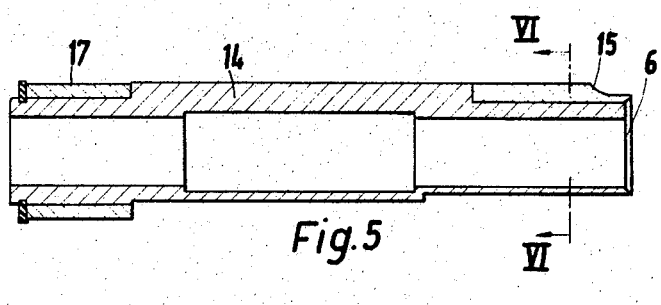
FIG. 5 is a longitudinal section along the line V—V in FIG. 3.
Figure 6:
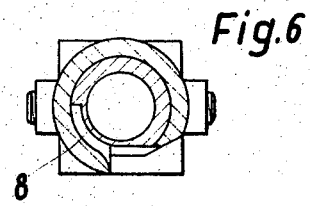
FIG. 6 is a transverse section along the line VI—VI in FIG. 5.

According to the invention, the slide takes the form of a sleeve 5, which can be displaced coaxially upon the winding mandrel 3 but is non-rotatable. The free end of the sleeve facing towards the length of wadding fleece 4 possesses a frontal part annular collar 6 (FIGS. 3 to 6), which bounds radially outwardly an internal tapered annular shoulder 7.

A guide groove 8 for the draw thread is provided in the inner surface of the sleeve and merges tangentially (at 9) into the front face of the annular shoulder 7 adjacent the collar 6. The groove 8 is directed against the rotation sense of the winding mandrel as shown by the arrow x and extends, arcuately shaped (at 10) towards that end remote from the winding mandrel whilst remaining at a constant distance from the long axis of the winding mandrel. Externally the sleeve 5 is tapered at 11 towards its free end.

The width of the guide groove 8 is designed to be smaller than that of the annular shoulder 7 and specifically in such a way that the annular shoulder bounds the guide groove radially inward at 12. The guide groove 8 extends over a circumferential angle of about 90° of the sleeve and merges at the end remote from the winding mandrel, with the edge 13 of a short longitudinal slot which extends from the front face of the sleeve and the collar 6. The sleeve takes the form of a core tube (FIG. 5), on the stepped end of which facing the free end of the winding mandrel a slotted pusher ring 15 is releasably attached by a screw 16. At that end of the core tube remote from the ring 15 there is mounted on a corresponding step a non-rotatable bush 17 provided with diametrally opposite studs 18a, 18b. The studs engage in slots 19 (FIG. 1) of a forked driver 20 secured to one end of a push rod 21, which is mounted for longitudinal displacement parallel to the longitudinal axis of the winding mandrel 3 in a part of the machine 22 shown partly broken away. Two tension springs, 23a, 23b engage with one end a cross head 24 mounted transversely upon the push rod and have their other ends connected to a fixed point 25a, 25b of the machine, and the push rod 21, with a rotatable roller 26 secured to its end remote from the fork-shaped driver 20, bears continuously upon a cam disc 27.

The cam disc 27 is coupled by an endless flexible component 28 with a shaft 29, which, through a further endless flexible component 30 is actuated by a drive motor 31.

Upon the shaft 29 is mounted a further cam disc 32, which operates in conjunction with a roller 33 at one end of a double lever 34. The double lever 34 is pivoted about an axis 35 and, by means of tension spring 36, which engages its other lever arm, has its roller 33 continuously pressed against the cam disc 32. The end of the double lever remote from the roller possesses a slot 37, engaged by a pin 38 attached to a block 39. The block 39 can be longitudinally displaced but is secured against rotation and coupled to a driving shaft 40 carrying the winding mandrel 3 at the opposite end so that it cannot be displaced axially with respect to said shaft 40 but allows the shaft to rotate. Thus is ensured a synchronous drive for the cam discs 27 and 32 and derived from them is an accurately determined axial movement of the push rod 21 and of the winding mandrel 3.

Non-rotatably attached to the driving shaft 40 of the winding mandrel 3 is a splined sleeve 41, engaged by a rack 42 which can be vertically reciprocated. The lower end of the rack is attached to a link lever 43, the lower end of which is articulatedly connected to a double lever 44. The double lever is pivotally mounted upon an axis 45. The end of the double lever 44 remote from the attachment point 46 for the link lever 43 is fitted with a roller 47, which, under the action of a tension spring 48, continuously makes contact with a cam disc 49. The cam disc 49 is coupled by a suitable gearing 50 to a shaft 51, which is itself coupled by a bevel gear 52 to the driving shaft of motor 31. It is quite clear that in this way cam disc 49, also, performs an accurately determined movement with relation to the axial reciprocating motions of the push rod 21 for the sleeve and of the driving shaft 40 for the winding mandrel 3 and ensures the clockwise and counter-clockwise rotation of the driving shaft 40 for the winding mandrel 3 corresponding to the reciprocating motion of the rack 42.

FIGS. 7 and 9 show that the winding mandrel 3 possesses a longitudinal slot 53, the length of which is designed to be slightly less than the width of the wadding pad 4 to be rolled up, and the gauge of the slot larger than the thickness of the pad 4. The fork prongs 54a, 54b formed by the slot are provided at their front ends with two notches 55 set transversely to the winding mandrel axis (FIG. 7) and lying, prior to the rolling of the pad, in the region of its outer longitudinal edges. The notches 55 on the free frontal side of the winding mandrel 3 are situated within the range of thread transfer device 56, which, in dependence upon the tractive force which a knotting device 57 exerts on the loop of the draw thread 1 against the effect of a resetting spring 58 (FIGS. 7 and 8), passes the loop onto the notches in the winding mandrel. The fork prongs 54a, 54b have a slightly smaller spacing from each other than the external diameter of a spiral guide 59. The spiral guide 59 is associated with a revolving wheel 60 for an endless flexible component 61 that, on each occasion, runs the draw thread 1 around the wadding pad 4 and is also associated with the knotting device 57.

The draw thread transfer device 56 is normally held by the spring resetting device 58 in the position illustrated by the full lines in FIG. 10 for receiving the loop of the draw thread 1 (FIGS. 12 and 13). The transfer position of the thread transfer device can be seen from the dotted line position in FIG. 10. The ends of the fork 56a, 56b cover, with a small clearance, the end face of the spiral guide 59 by means of a part which runs to a point from transfer shoulders 56c for the loop, which clearance is nevertheless sufficient to ensure the transfer of the loop of the draw thread 1 from the spiral guide onto the transfer shoulders 56c, onto which the thread loop arrives by the effect of the traction exerted on it by the knotting device. In the course of the pivoting of the thread transfer device the thread loop becomes forced more strongly against the above mentioned ends 56a, 56b of the device, as FIG. 7 clearly shows. The end of the transfer device remote from the ends of the work is arranged to pivot on an axis 62 parallel with the plane of rotation of the travelling component 61. The spiral track of the guide merges in the direction of its frontal side into a nose 59a extending somewhat tangentially beyond the spiral's circumference. When the spiral guide is rotated this nose moves with only a small clearance past the ends 56a, 56b of the transfer fork serving to take up the loop of the draw thread 1. FIGS. 12 and 13 clearly show that in this operation the nose and the ends of the thread transfer device overlap in such a way as to ensure that the loop of the draw thread 1 can slide over the guide nose 59a onto the transfer device.

As shown in FIG. 8, the knotting device also comprises another guide wheel 63 for the endless flexible component 61, with which is connected a controllable thread puller 64. The guide wheel 63 is connected to a knotting hook, which is not illustrated, and which cooperates with a thread guide cam 65. A control lever 66 serves to shut off the machine when a loop is not knotted. A supply spool for the thread is shown as 67. The knotting device is not part of the present invention.

The apparatus described operates according to the invention as follows:

When the knotted loop of the draw thread 1, encircling with clearance the length of wadding to be rolled up, has been transferred into the end face notches 55 of the winding mandrel 3 which embraces the wadding fleece at both sides, the sleeve 5, which can be displaced only axially, is displaced by a multiple of the axial distance between the end surface of the annular collar 6 and the internal annular shoulders 7 in the direction of the wadding fleece 4. The doubled, knotted end of the thread 1 is then drawn by the subsequent rotation of the winding mandrel 3 into the annular space bounded by the annular collar 6, the winding mandrel 3, the roll of wadding 2 and the annular projection 7 thus forming a spiral-shaped winding of thread and, specifically, in such a way that the winding lies within the roll of wadding and is substantially flush with its outside surfaces. On completion of the winding mandrel's rotation, the wadding roll 2 is pushed by the action of the sleeve 5 over the free end of the winding mandrel with the result that the winding of thread 68, because of the greater friction between the wadding and the thread material, remains attached to the roll when the sleeve is later drawn away from the ejected wadding roll 2.

The apparatus above described achieves the advantageous working cycle wherein after the draw thread loop encircling the wadding pad with clearance has been transferred to the winding mandrel, the pad is rolled up whilst the projecting end of the draw thread is synchronously wound into a winding and pressed against the end of the roll, this being done in timed relation with the knotting operation so that a further knotted loop is prepared ready to be thrown around the next wadding pad whilst the preceding pad is being rolled up.

The arrangement of the annular collar on the end surface of the winding mandrel adjacent the wadding pad, in combination with the internal annular shoulder and the associated can ensures that the draw thread will be evenly wound and pressed against the frontal side of the cotton wool pad with the high reliability required by mass production. This arrangement of the thread has various advantages. Firstly, when the pad is later compressed and packed in the finished condition, the draw thread can neither be damaged nor interfere with the smooth flow of production. Secondly, the arrangement simplifies the actual handling of the tampon by the user, since the end of the draw thread can be located with ease and certainty even in the dark, so that use of the tampon can be begun without the time-consuming manipulations which may be involved in the undesirable loosening of the tampon wadding. Finally, an advantage is that the arrangement favours the use of a clearly visible coloured draw thread, which was not previously possible for reasons of presentation, because a coloured draw thread projecting from the front end of the tampon could impair its appearance.

I claim:

1. A method of producing a tampon comprising encircling a wadding pad with a loop of thread; knotting said loop of draw thread loosely around the wadding pad; mounting said pad on a mandrel, wherein said loop of draw thread surrounds the wadding pad in a plane substantially parallel to the axis of rotation of the mandrel; rotating said mandrel whereby rolling up the pad; forming an annular recess in an end of the rolled pad adjacent to the knotted ends of the draw thread and simultaneously spirally winding the knotted ends of the draw thread into a flat winding seated within said annular recess.

2. A method as claimed in claim 1 including axially displacing a hollow sleeve around and along part of the mandrel whilst the latter is rotating to roll up the wadding pad, whereby forming said annular recess within that end of the rolled pad adjacent the knotted ends of the draw thread.

References Cited

UNITED STATES PATENTS

| 2,094,086 | 9/1937 | Webb | 19—144.5 |
| 2,425,004 | 8/1947 | Rabell | 19—144.5 |
| 2,763,899 | 9/1956 | Niepmann et al. | 19—144.5 |
| 2,926,394 | 3/1960 | Bletzinger et al. | 19—144.5 |
| 3,131,436 | 5/1964 | Greiner et al. | 19—144.5 |

DORSEY NEWTON, Primary Examiner

Disclaimer 3,477,102.—*Herbert Etz*, Wuppertal-Langerfeld, Germany. METHOD OF MANUFACTURING TAMPONS. Patent dated Nov. 11, 1969. Disclaimer filed Aug. 27, 1979, by the assignee, *Dr. Carl Hahn, G.m.b.H.*
Hereby enters this disclaimer to claims 1–2 inclusive of said patent.
[*Official Gazette June 10, 1980.*]